May 1, 1951 — H. W. LACHMILLER — 2,550,827
ROTARY TRAP CHAMBER WITH MEANS FOR VARYING THE VOLUME THEREOF
Filed Nov. 12, 1948 — 2 Sheets-Sheet 1

INVENTOR.
HENRY W. LACHMILLER,
BY
McMorrow, Berman & Davidson
ATTORNEYS.

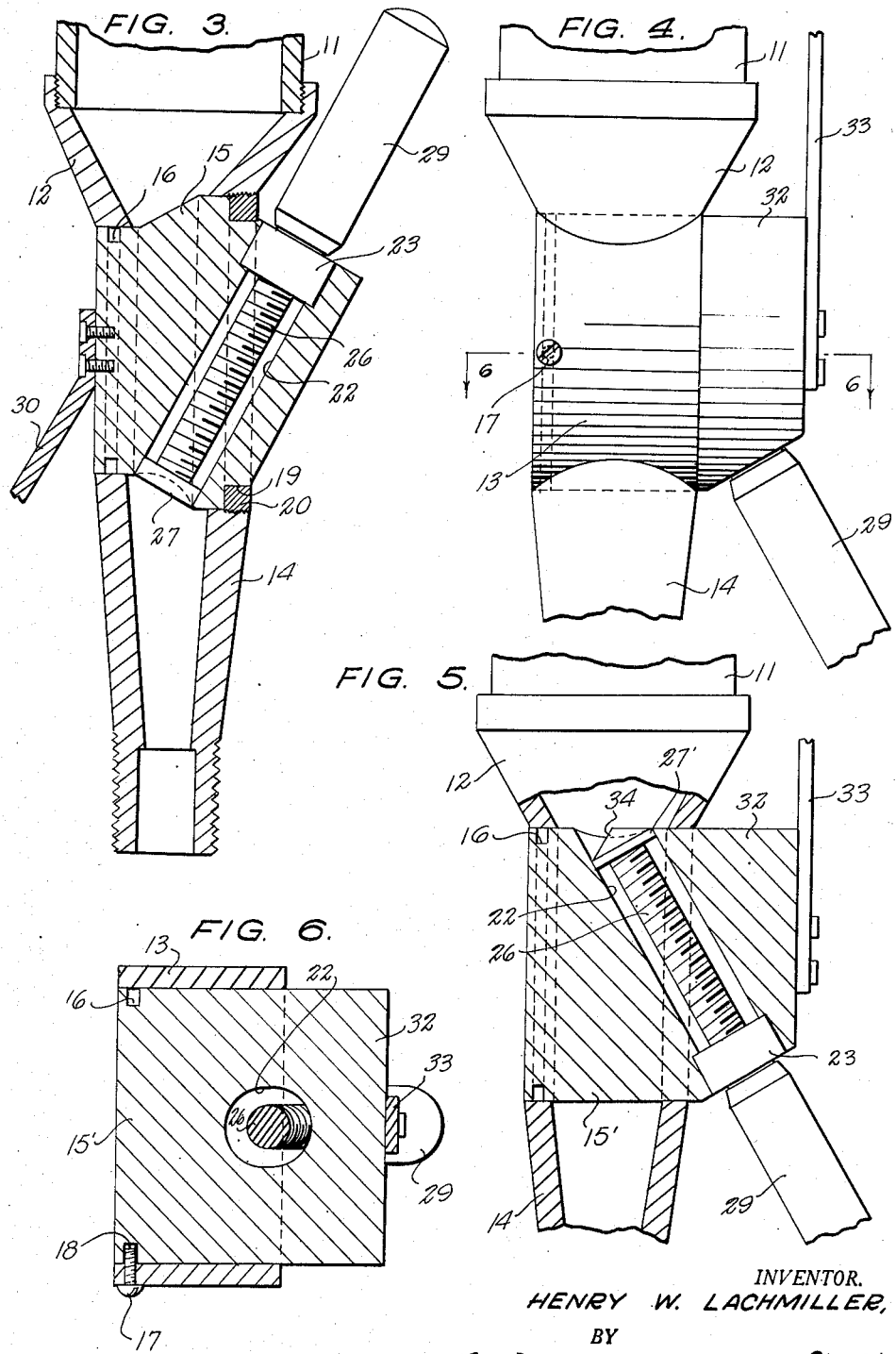

Patented May 1, 1951

2,550,827

UNITED STATES PATENT OFFICE 2,550,827

ROTARY TRAP CHAMBER WITH MEANS FOR VARYING THE VOLUME THEREOF

Henry W. Lachmiller, Los Angeles, Calif., assignor to Lyle S. Corcoran, Los Angeles, Calif.

Application November 12, 1948, Serial No. 59,513

1 Claim. (Cl. 222—308)

This invention relates to measuring devices and particularly to devices for making accurate volumetric measurements of finely comminuted solids, such as powder and the like.

A main object of the invention is to provide a novel and improved powder measuring device which enables accurately metered quantities of powder or the like to be measured off, said device being very simple in construction, easy to operate and provided with means for accurately adjusting the volume of material to be measured off.

A further object of the invention is to provide an improved powder measuring machine which is inexpensive to fabricate, rugged in construction, and which enables any desired volume of powder, within a substantial range to be very accurately dispensed, only a very simple operation being required to change the volumetric setting of the machine.

Further objects and advantages of the invention will become apparent from the following description and claims, and from the accompanying drawings, wherein:

Figure 3 is a fragmentary cross-sectional view similar to Figure 2 but showing the machine in a charge-releasing position.

Figure 4 is a fragmentary side elevational view showing a modified form of powder measuring machine according to this invention.

Figure 5 is a view similar to Figure 4 but partly in vertical cross-section.

Figure 6 is a cross-sectional view taken on line 6—6 of Figure 4.

Figure 1:
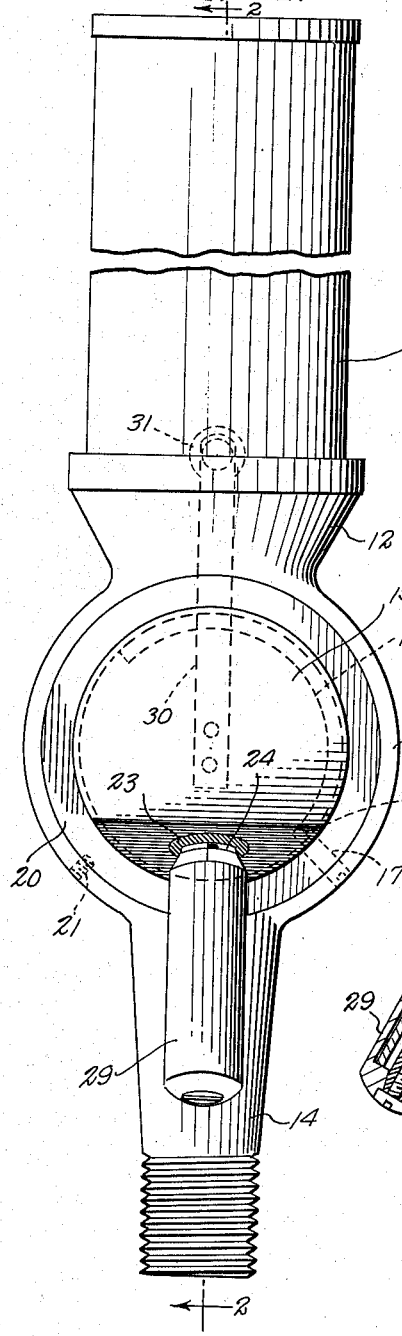
Figure 1 is a front elevational view of a powder measuring machine constructed in accordance with the present invention, shown in position to measure off a charge of powder.

Referring to the drawings, and more particularly to Figures 1 to 3, 11 designates a cylindrical hopper threaded at its lower end into the top of a downwardly converging funnel member 12. Funnel member 12 merges into an enlarged annular housing portion 13, which in turn merges into a bottom spout member 14. Designated at 15 is a valve member rotatably received in housing portion 13 for rotation around the horizontal axis of said housing portion. At one marginal portion thereof, valve member 15 is formed with a peripheral groove 16 extending half way around the valve member. Threaded through the wall of housing portion 13 adjacent said groove is a screw 17 having an end portion 18 received in said groove, whereby valve member 15 is limited to one half revolution clockwise from the position shown in Figure 1. Valve member 15 is formed at its opposite margin with an annular seat 19 which receives a retaining ring 20 threaded into the housing portion 13 at said seat, whereby said valve member is restrained against outward axial movement. A set screw 21 is threaded through the wall of housing portion 13 and lockingly engages the retaining ring 20.

Valve portion 15 is formed with an inclined cylindrical passage 22 in the end of which is secured the flanged end 23 of a sleeve member 24 which extends outwardly from passage 22 coaxially therewith. Designated at 25 is a rod member extending axially through sleeve member 24 and having an enlarged threaded extension 26 threadedly engaging the inner wall of the flange portion 23 of the sleeve member. Extension 26 carries at its end a concave piston element 27, the concavity of said element being shown at 28. Piston element 27 has a close rotating fit within the cylindrical passage 22.

Figure 2:
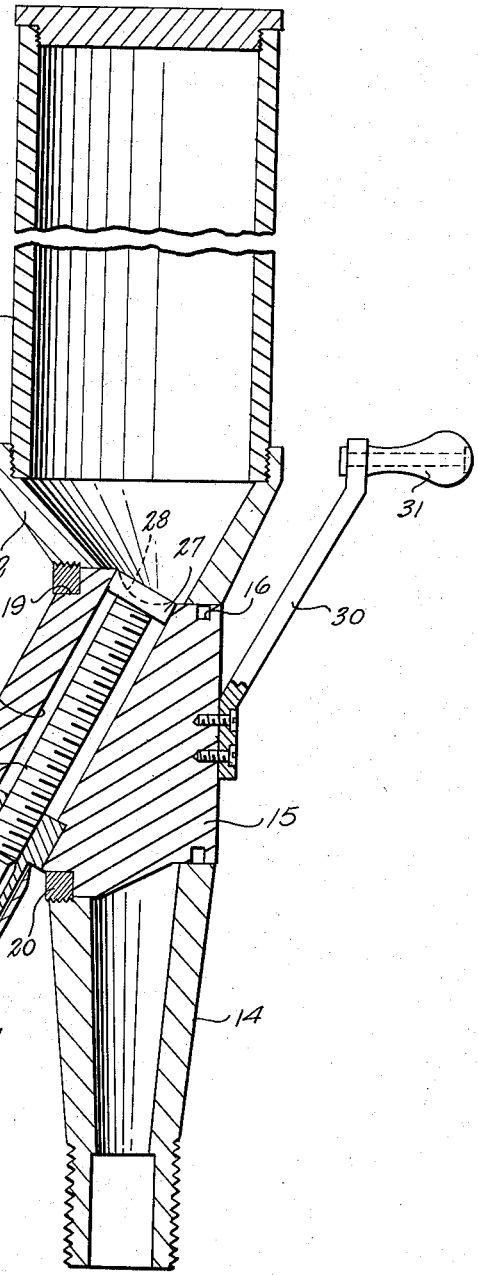
Figure 2 is a vertical cross-sectional view taken on line 2—2 of Figure 1.

Secured to the outer end of rod member 25 is a sleeve-like handle member 29 which surrounds the sleeve member 24 as shown in Figure 2, and is axially rotatable with respect thereto.

Secured to the central portion of the end surface of valve member 15 opposite handle member 29 is an inclined arm 30 provided at its end with a horizontal handle 31.

In the position of valve member 15 illustrated in Figures 1 and 2, the inner end of passage 22 faces upwardly in funnel portion 12 and receives powder therefrom. The amount of powder received therein is determined by the setting of the piston element 27. This setting is obtained by adjusting the handle 29 to a desired position of rotation. The outer surface of sleeve member 24 may be calibrated in volumetric units, so that handle 29 may be set to an axially adjusted position relative to sleeve member 24 corresponding to a desired volume of powder to be admitted in passage 22.

To discharge the measured volume of powder, valve member 15 is rotated by means of handle 31 to the inverted position of Figure 3. Valve member 15 has a close rotative fit in annular housing 13, so that the charge of powder is carried along with the valve member until the end of passage 22 is exposed downwardly to the spout member 14. The powder is therefore released and passes downwardly through the spout member to the receptacle to which it is to be transferred.

The measuring operation may be repeated by returning the valve member 15 to the position of Figures 1 and 2. The volume of the charge being measured may be readily changed by readjusting the handle 29.

The separate handle 31 enables the valve member 15 to be rotated without disturbing the adjustment of metering handle 29.

In the embodiment of Figures 4 to 6, the valve member, designated at 15' has an extension 32 adjacent the handle 29, to which is secured the vertical crank bar 33. Crank bar 33 may be provided with a suitable handle similar to handle 31. The operation of the embodiment of Figures 4 to 6 is the same as previously described. However, the actuating handle is on the same side of the machine as the micrometer handle 29 instead of being located opposite thereto as in Figures 1 to 3. Another difference in structure is that in the embodiment of Figures 4 to 6, the piston element, shown at 27', has a conical face 34, instead of being concave as in the embodiment of Figures 1 to 3.

While certain specific embodiments of a powder measuring device have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A device for measuring successive predetermined quantities of powder or the like, comprising in combination: a hopper and a delivery spout arranged in general vertical alignment and separated by a transversely directed tubular bearing section which bearing section consists of a hollow, substantially cylindrical shell disposed with its axis in a horizontal direction, and having an opening in its upper periphery communicating with the hopper discharge opening and a second opening in its lower periphery communicating with said delivery spout; a tubular valve member substantially cylindrical in shape and mounted within said hollow cylindrical shell, coaxially therewith, for rotation about said horizontal axis, said valve member having an inclined, substantially vertically disposed passage, the inner end of said passage being open, the outer end of said passage having a piston reciprocably mounted therein, said passage being angularly so disposed that said inner end is adapted alternately to register with said hopper and said spout, the external surface of said valve member being substantially of the same conformation and dimensions as the inner surface of said hollow shell whereby, when the valve is rotated, said inner surface forms a sliding closure for said inner end of said passage; a rod connected to said piston, disposed in threaded engagement with the valve and extending outward from the bearing section; and a sleeve carried by the valve so as to be alignable with the projecting portion of the rod and thus to indicate the variable volume within the open portion of said valve which is determined by the particular location of the piston therein.

HENRY W. LACHMILLER.

REFERENCES CITED

The following references are of record in the file of this patent:

UNITED STATES PATENTS

| Number | Name | Date |
| --- | --- | --- |
| 221,104 | Rykard | Oct. 28, 1879 |
| 715,259 | Glisson | Dec. 9, 1902 |
| 845,572 | Peck | Feb. 26, 1907 |
| 1,053,169 | Gillespie | Feb. 18, 1913 |
| 1,165,508 | Irish | Dec. 28, 1915 |
| 1,767,928 | Jellison | June 24, 1930 |